United States Patent [19]

Kauffman

[11] 3,755,645
[45] Aug. 28, 1973

[54] MAXIMUM AVERAGE GAP VOLTAGE CONTROL FOR EDM POWER SUPPLY

[75] Inventor: Harry D. Kauffman, Cincinnati, Ohio

[73] Assignee: Cincinnati Milacron Inc., Cincinnati, Ohio

[22] Filed: Apr. 21, 1972

[21] Appl. No.: 246,157

[52] U.S. Cl. .............................. 219/69 C, 219/69 G
[51] Int. Cl. ........................... B23p 1/08, B23p 1/14
[58] Field of Search .............. 219/69 C, 69 G, 69 P, 219/69 S

[56] References Cited
UNITED STATES PATENTS
3,649,802  3/1972  Sennowitz ..................... 219/69 C
3,539,753  11/1970  Ullmann et al. .................. 219/69 C Primary Examiner—R. F. Staubly
Attorney—Howard T. Keiser, et al.

[57] ABSTRACT

A gap sensing circuit in conjunction with an inhibit circuit defines apparatus for maintaining the average voltage across the gap between an electrode tool and workpiece of an EDM mechanism within a predetermined maximum level. The gap sensing circuit monitors the peak voltage present across the gap, and enables an inhibit circuit to produce a signal suppressing the production of sustained machining pulses when the average voltage across the gap exceeds a predetermined maximum level. The sensing network disables the inhibit circuit when the gap voltage returns to an acceptable level.

4 Claims, 3 Drawing Figures

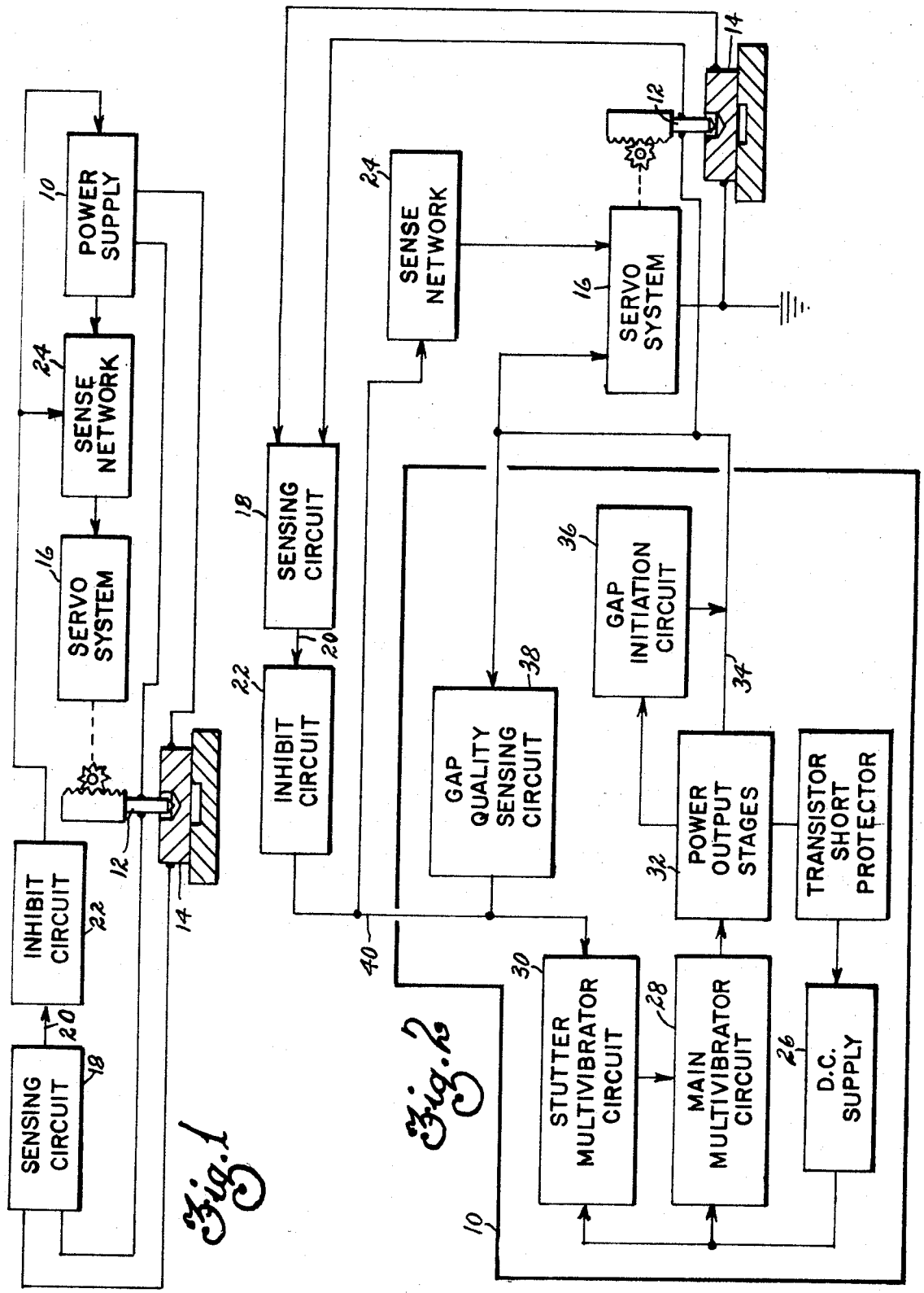

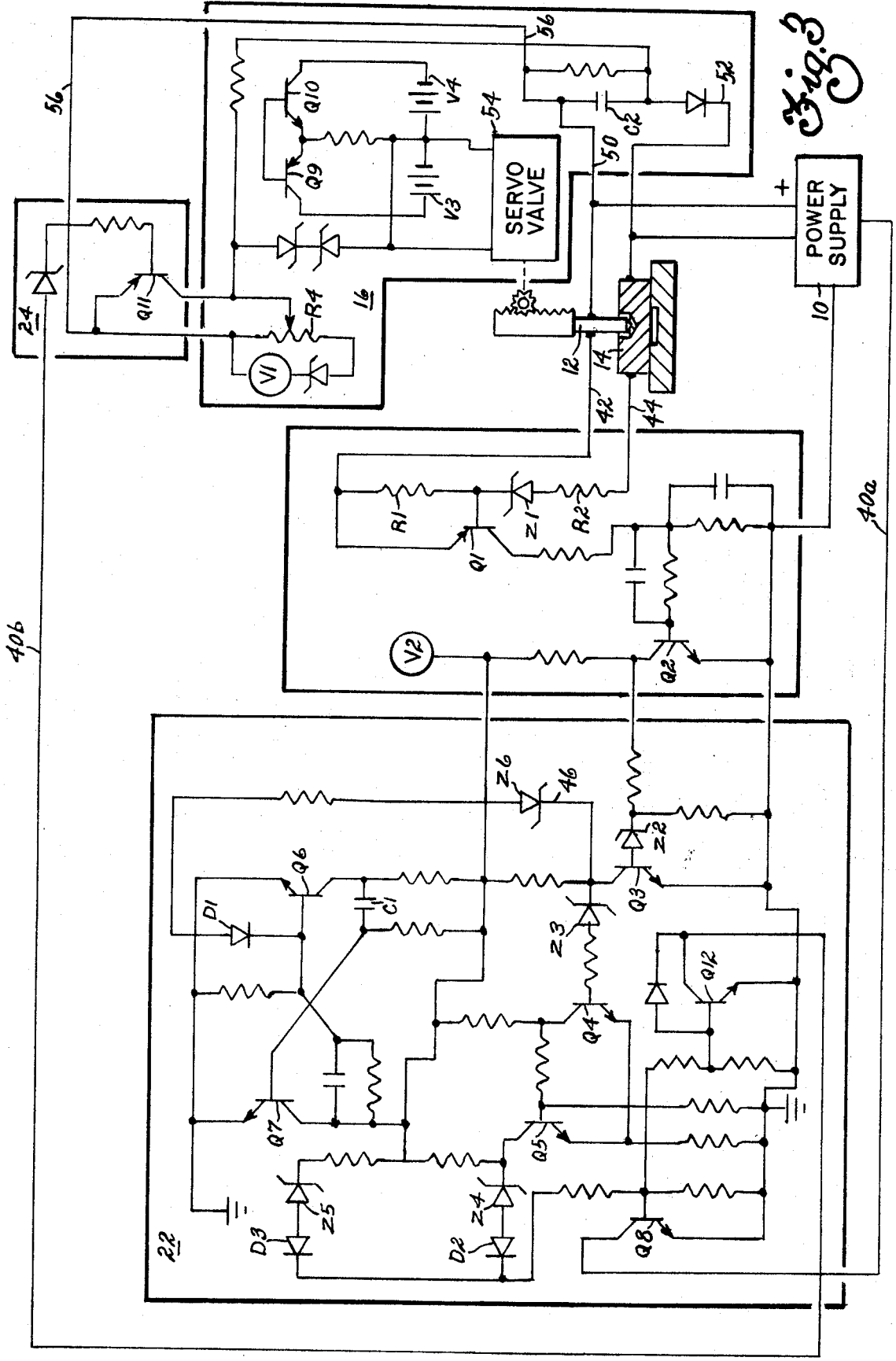

MAXIMUM AVERAGE GAP VOLTAGE CONTROL FOR EDM POWER SUPPLY

BACKGROUND OF THE INVENTION

The invention relates generally to electrical discharge machines (EDM) and more particularly to power supply circuits therefor.

In an EDM apparatus, a power supply provides pulses to electrodes, producing spark discharges across the gap between the conductive tool electrode and a conductive workpiece serving as the second electrode. These spark discharges must occur so that there is no damage to the tool or the workpiece and in a manner that minimizes the danger of injury to operating personnel and other environmental factors. At the initiation of ionization of the gap between the tool electrode and the workpiece, a temporary series of high voltage pulses corresponding to the machining pulses is supplied to facilitate the machining process. Once the gap reaches normal machining characteristics this high voltage initiation source is dropped out of the supply circuit and the apparatus performs in the usual manner.

During the period when an initial gap ionization high voltage charge is present, the average voltage across the gap may reach voltage levels above a predetermined maximum as limited by the electrode and work capabilities or other extrinsic factors. The present invention provides means for maintaining the voltage across the gap within this preselected maximum average voltage level.

SUMMARY OF THE INVENTION

Applicant herein discloses a sensing network for determining when the average voltage exceeds a predetermined maximum level during gap ionization. The invention further provides a means for maintaining the gap voltage at or below the predetermined maximum average gap voltage when said sensing network detects an average voltage level in excess of the predetermined maximum.

The sensing network is coupled to continuously measure the voltage drop across the machining gap. When the gap voltage exceeds the predetermined maximum average voltage level, the sensing network produces an enabling signal which is input to an inhibit network. The inhibit network then produces an output that suppresses the production of machining pulses by the power supply thus reducing the average voltage drop across the gap. The electrode tool continues to move toward the workpiece during this period. After a fixed time delay, the inhibit circuit output is discontinued and machining pulses are again produced. When the average gap voltage is within the predetermined maximum level the EDM apparatus continues to function in a normal machining mode.

THE DRAWINGS

FIG. 1 is a general flow chart of the preferred embodiment of the present invention.

FIG. 2 is an exemplary EDM system utilizing the invention by interfacing into a typical oscillator circuit in order to inhibit the production of output pulses.

FIG. 3 illustrates one embodiment of the invention in detailed schematic form.

DETAILED DESCRIPTION

Referring first to FIG. 1, there is shown a typical EDM system comprising a power supply 10 for providing a series of high frequency pulses to the gap between the tool electrode 12 and the workpiece 14. The servo-system 16 provides movement of the tool 12 with respect to the work 14 and in conjunction with the power supply output. Generally, the power supply 10 includes an integrated sensing network for monitoring gap conditions. The servo-system responds to the monitor signal to cause movement of the tool 12 into or out of the workpiece 14 in order to maintain near ideal gap machining conditions. Thus, as the gap voltage drops, the servo 16 moves the tool 12 out of the work 14 and as it increases, the tool 12 is moved toward the work.

There is provided by the present invention a sensing network 18 for monitoring the gap voltage and maintaining it at or below a predetermined maximum average level. This is particularly advantageous during gap ionization. Generally, it is at this time when temporary high frequency, high voltage pulses are superimposed upon each of the normal machining pulses to hasten the ionization process. During this period, the average gap voltage at times exceeds a predetermined maximum level. By monitoring the gap voltage and inhibiting the production of machining pulses when the average voltage level is higher than a predetermined maximum level, the average voltage level at the gap can be effectively reduced.

The sensing network 18 produces an enabling signal whenever the average gap voltage over a preselected period of time exceeds the predetermined maximum average level. This enabling signal is transmitted over carrier 20 to the inhibit circuit 22. The inhibit circuit 22 then produces an output signal that turns off the power supply 10 for a period of time, thus effectively reducing average voltage level in a fixed time frame.

As previously mentioned, the output of the servo-system 16 responds to the gap conditions. Generally, when the gap voltage decreases to a level below that present during normal machining the servo-system 16 generates a signal moving the tool 12 away from the work 14. Such a condition exists when the power supply 10 is turned off by inhibit network 22. To counter the action calling for movement of the tool 12 away from the work a sense network 24 has been interposed between the power supply 10 and the servo-system 16. Sense network 24 receives the inhibit signal from the inhibit circuit 22 and produces an output that overrides the signal from the power supply 10 indicating that the servo-system 16 should withdraw the tool 12. Thus, when the inhibit signal is present at sense network 24 the servo-system 16 continues to move the tool 12 toward the work 14 while the power supply 10 ceases the production of machining pulses.

When the voltage average is within the predetermined maximum level the sensing network 18 stops production of an enabling signal. This turns off the inhibit circuit 22 and permits the power supply 10 and servo-system 16 to operate in the typical manner.

There is illustrated in FIG. 2 an exemplary EDM system utilizing the present invention to monitor and control the average voltage level at the gap. The power supply 10 comprises a DC power source 26 which is coupled to the main multivibrator circuit 28 and a secondary multivibrator circuit 30. The main multivibrator 28, in conjunction with the DC power source 26, provides a series of high frequency pulses which are input to the power output stages 32. The output from the power stages 32, present on carrier 34, is then supplied to the gap between the workpiece 14 and the tool 12. Prior to machining and during gap ionization a second output from the power stage 32 enables gap initiation circuit 36 to produce a superimposed pulse train coinciding with the pulses on carrier 34. When the gap reaches a predetermined ionization level the gap initiation circuit is disabled and the output on carrier 34 is solely that of the power stages 32.

The output on carrier 34 is transmitted not only to the gap to facilitate machining but also to the servo-system 16 and the gap quality sensing circuit 38. The gap quality sensing circuit 38 monitors the gap voltage conditions and adjusts the output pulses present on carrier 34 in accordance therewith. Typically, the gap quality sensing circuit 38 monitors the quality of the machining discharges at the gap and inhibits the production of pulses at the gap if the quality is below the desired standard. This is accomplished by enabling the stutter multivibrator circuit 30 to produce a clamping output inhibiting the output of the main multivibrator circuit 28. The functions of the stutter multivibrator circuit 30 and the gap quality sensing circuit 38 are more fully disclosed in U.S. Pat. No. 3,483,347, issued to J. E. Losey, and assigned to the present assignee.

In the example set out in FIG. 2, the inhibit circuit 22 is interfaced to the stutter multivibrator circuit 30. However, it should be understood that the monitoring circuitry of the present invention may be integrated with the existing circuitry in any suitable manner without interfering with the scope or spirit of the invention herein disclosed. One beneficial manner in which this may be accomplished would be to have two sensing circuits 18 and 38 connected in parallel to the main multivibrator circuit 28, rather than in series through the multivibrator 30 as shown.

In the present system, the sensing circuit 18 is connected across the gap to measure the gap voltage conditions while machining is in progress. When the gap voltage exceeds a predetermined maximum average voltage level the sensing circuit 18 generates an enabling signal which is transmitted over carrier 20 to the inhibit circuit 22. The inhibit circuit 22 then produces an output signal which is transmitted over carrier 40 to the stutter multivibrator circuit 30 thus inhibiting the output of pulses on carrier 34 in the same manner as an output from the gap sensing circuit 38.

There are, therefore, two sensing circuits herein disclosed. It is beneficial to distinguish their separate functions. The gap quality sensing circuit 38 is basically a quality sensor. Its purpose is to monitor the gap conditions at all times and determine the quality of the machining pulses. When the quality is below a preset standard the quality sensing circuit 38 enables stutter multivibrator 30 to inhibit the production of pulses temporarily until the condition causing the substandard machining discharges is removed. At this time, the stutter multivibrator 30 is disabled and the production of machining discharges continues. Sensing circuit 18 of the present invention also monitors the gap condition, but only serves to inhibit the production of machining pulses when the voltage drop across the gap exceeds a predetermined maximum average level. When this condition is present, the sensing circuit 18 enables the inhibit circuit to switch the multivibrator 30 in the same manner as gap quality sensing circuit 38. The production of pulses is thus in discontinuity until the average voltage drop across the gap returns to a level below the predetermined maximum.

As previously mentioned, the typical EDM system is designed so that unsatisfactory gap conditions result in the servo-system 16 withdrawing the tool 12 from the workpiece 14. Generally, the cessation of pulses at the gap, present on carrier 34, is one of the conditions resulting in the withdrawal of the tool 12. In the application of the present invention this is to be avoided, for the only period of time the gap voltage can exceed the predetermined maximum average is during gap ionization, when one of the high frequency pulses produced by the gap initiation circuit 36 is superimposed upon a machining pulse produced by the power output stages 32.

The output of the inhibit circuit 22 is also transmitted to the sense network 24. This network produces an output which overrides the output of the power supply 10, or lack thereof, and allows the tool 12 to continue toward the workpiece 14. Once the average gap voltage is below the predetermined maximum, the inhibit circuit 22 ceases the production of an inhibit signal. Thus the servo 16 and the power supply 10 are monitored only by the gap quality sensing circuit 38 during the period when average voltage across the gap is within the predetermined maximum limit, which is the case when normal machining is in progress.

FIG. 3 illustrates a detailed embodiment of the present invention. The power supply 10 is connected across the gap, the electrode tool 12 being positive and the work 14 being negative. The positive side of the power supply 10 is also connected to the servo-system 16 as best shown in FIG. 2. Carriers 42 and 44 connect the sensing circuit 18 across the gap.

Zener diode $Z_1$ acts as a limiter allowing current through resistors R1 and R2 only when the voltage across the gap reaches a predetermined level. When this level is reached base of transistor Q1 is biased, which in turn biases the base of transistor Q2. When the base of transistor Q2 is biased in this manner the base of transistor Q3 is switched from a normally biased condition to the unbiased state. The Zener diode Z2 serves to prevent the biasing of transistor Q3 by any extrinsic source during the period transistor Q2 is biased, which is indicative of the higher than maximum voltage being present at the gap.

When the base of transistor Q3 is unbiased in this manner, a higher voltage drop occurs across the Zener diode Z3, allowing it to conduct. This biases the base of transistor Q4. Transistors Q4 and Q5 form a typical Schmitt trigger circuit, thus when the transistor Q4 is biased or turned on, transistor Q5 is turned off. When this occurs a higher voltage drop occurs across Zener diode Z4 allowing it to conduct. This biases the transistor Q8 allowing it to conduct, producing an inhibit signal which is transmitted via carrier 40a to the power supply 10 to suppress the production of machining pulses.

Thus, the Zener diode Z1 conducts whenever the peak of a machining pulse is above the maximum predetermined voltage level, and initiates the production of the output by inhibit circuit 22. In this manner the average voltage level across the gap is effectively decreased.

As previously mentioned the inhibit signal on carrier 40a can be interfaced to power supply 10 a variety of ways. One way is to have the stutter multivibrator circuit 30 of the herein referred to U.S. Pat. No. 3,483,347 responsive to a single pulse rather than a series of pulses. Thus, the signal generated by switching the Schmitt trigger from the stable state to the quasi-stable state creates an output which turns on the stutter multivibrator circuit for a period of time, inhibiting the production of pulses by the power supply 10.

Another manner of interfacing the inhibit circuit to the existing power supply circuitry is to include a multivibrator functioning as a typical one-shot circuit, or ramp generator, for example, the circuit consisting of transistors Q6 and Q7. When this system is utilized, the Schmitt triggering circuit produces an immediate output by biasing the transistor Q8. However, when the transistor Q3 is switched to a non-conducting state, carrier 46 is connected in parallel with the Zener diode Z3. When the voltage drop across diode Z3 increases, it increases in a like manner across Zener diode Z6 allowing it to conduct. This turns on multivibrator transistor Z6. Transistor Q7 which is normally biased is thus unbiased, or turned off, as the capacitor C1 discharges through transistor Q6 and becomes more positive on the transistor Q7 side. When transistor Q7 is switched to the unbiased state, a higher voltage drop occurs across the Zener diode Z5 producing an output that biases transistor Q8. This generates an output on carrier 40a in the same manner as the Schmitt trigger circuit. However, when the transistor Q1 stops conducting, due to the gap conditions being below the predetermined maximum level and the Schmitt trigger switches to a stable state turning on transistor Q5 eliminating the current flow through the Zener diode Z4, the one-shot continues to produce an output through the Zener diode Z5. This output is continued until the capacitor C1 charges completely, the terminal being nearest transistor Q7 becoming more negative. At that point, transistor Q7 returns to the normally biased state and begins to conduct. The voltage across this Zener diode Z5 is then reduced and no longer conducts. The transistor Q8 is then unbiased and the output on carrier 40a is discontinued. The diodes D1, D2, and D3 are inserted in the circuit to isolate the various circuit branches.

When the one-shot circuit comprised of transistors Q6 and Q7 is utilized, the sensing network and inhibit network of the present invention may be interfaced in a variety of ways to the existing electrical circuitry. For instance, if the stutter multivibrator circuit 30, as shown in FIG. 2, is set to respond only to an input present for a period of time, the time constant of the RC loop containing capacitor C1 can be adjusted to provide the proper signal. Another method of interfacing the inhibit circuit 22 to the existing power supply 10 is the placing of the present invention in parallel with the multivibrator circuit 30 and the gap quality sensing circuit 38 of FIG. 2 thus providing a unique input to the main multivibrator circuit 28 for inhibiting the production of pulses during the period of time when the one-shot circuit is producing an output.

The sense network 24 is also enabled when the Zener diode Z4 or Z5 is conducting. Transistor Q12 is in parallel with transistor Q8 and is biased ON whenever transistor Q8 is so biased. The transistor Q12 is isolated from transistor Q8 because the operating characteristics of transistor Q8 are generally not sufficient for efficient operation of the sense network 24. This scheme further provides circuit isolation of the load elements.

When transistor Q8 and Q12 are conducting the sense network 24 is enabled to provide a signal via carrier 40b causing the servo-system 16 to drive to tool 12 toward the work 14. The simplified servo-system 16 is coupled to the gap via carriers 50 and 52. Thus, the capacitor C2 is charged to approximately the average voltage across the gap. A reference voltage V, is present and in parallel with the gap, the positive terminals of the gap, capacitor C1, and reference voltage V1 being in common and connected via carrier 56.

The variable resistance R4 sets the voltage present in parallel with capacitor C2 to a level somewhat below the charge on capacitor C2 when the gap is experiencing normal working conditions. Therefore, during ionization, when the voltage across the gap is high, the charge on capacitor C2 is higher than the voltage across resistor R4. This biases the transistor Q9, allowing it to conduct, generating a current from voltage source V3 through transistor Q9, and through the servo-valve apparatus 54. This drives the tool 12 toward the work 14.

When the gap is shorted, or the voltage at the gap is reduced to the level where the charge on capacitor C2 is less than the reference voltage at resistor R4, transistor Q9 is switched off and transistor Q10 begins to conduct. This allows current to flow from voltage source V4, through the servo 54 and through transistor Q10, causing the servo-valve 54 to withdraw the tool 12.

To counter this when the power supply 10 is shut off during the presence of an excessive average voltage level at the gap the sense network 24 has been added to the existing servo-loop. When an inhibit signal is present on carrier 40b, the transistor Q11 is biased on. This shunts the reference voltage at resistor R4 to the positive carrier 56, effectively reducing it to zero. Thus the charge present on capacitor C2 always exceeds the voltage present on resistor R4 and transistor Q9 conducts, driving the tool 12 toward the work 14. When the inhibit signal on carrier 40b is discontinued, the transistor Q11 is turned off, allowing the servo-system 16 to operate in the typical manner.

It should be understood that the foregoing is for illustrative purposes only and is not intended to limit the spirit of the invention or the scope of the appended claims.

What is claimed is:

1. In an electrical discharge machine apparatus having a power supply for producing machining discharges across a gap between electrodes including a conductive tool and a conductive workpiece, and a servo-means for feeding the tool and workpiece relative to each other at a predetermined feed rate an improvement comprising:
   a. first means for producing an output when the gap voltage exceeds a predetermined maximum average level; and
   b. second means responsive to said output for inhibiting the application of pulses to the gap during the period the gap voltage exceeds said predetermined maximum average level.

2. The apparatus of claim 1 wherein there is further comprising:
   a. means for sensing suppression of the pulses to the gap by the inhibiting means; and
   b. means for maintaining the feed rate of the tool relative to the workpiece at a constant rate in response thereto.

3. The apparatus of claim 1 wherein there is further included a multivibrator circuit coupled to said inhibiting means and operable to suppress the production of pulses by the power supply for a preset period of time following the sensing of an average gap voltage level in excess of the predetermined maximum.

4. In an electrical discharge machining apparatus having a power supply for producing machining discharges across a gap between electrodes including a conductive tool and a conductive workpiece, and a servo-means for feeding the tool and the workpiece relative to each other at a predetermined feedrate an improvement comprising:

a. means for producing an output when the gap voltage exceeds a predetermined maximum average level;

b. means responsive to said output for inhibiting the application of pulses to the gap during the period the gap voltage exceeds the predetermined maximum average level;

c. means for sensing suppression of pulses to the gap by said inhibiting means;

d. means for maintaining the feed rate between said tool and workpiece while said pulses to the gap are suppressed; and e. a multi-vibrator coupled to said inhibiting means operable to continue the suppression of production of machining discharges at the gap by the power supply for a preset period of time following the sensing of an average voltage level in excess of the predetermined maximum.

* * * * *